(12) United States Patent
Warnakulasuriya

(10) Patent No.: US 10,978,963 B2
(45) Date of Patent: Apr. 13, 2021

(54) MULTI-PHASE SHIFT TRANSFORMER BASED AC-DC CONVERTER

(71) Applicant: Murata Manufacturing Co., Ltd., Nagaokakyo (JP)

(72) Inventor: Kapila Warnakulasuriya, Milton Keynes (GB)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/690,503

(22) Filed: Nov. 21, 2019

(65) Prior Publication Data
US 2020/0169182 A1 May 28, 2020

(30) Foreign Application Priority Data
Nov. 22, 2018 (GB) .................................. 1819044

(51) Int. Cl.
| | |
|---|---|
| H02M 7/06 | (2006.01) |
| H02M 3/335 | (2006.01) |
| H02M 1/42 | (2007.01) |
| H01F 27/24 | (2006.01) |
| H01F 27/28 | (2006.01) |
| H01F 30/12 | (2006.01) |

(52) U.S. Cl.
CPC .............. *H02M 7/06* (2013.01); *H01F 27/24* (2013.01); *H01F 27/28* (2013.01); *H01F 30/12* (2013.01); *H02M 1/4258* (2013.01); *H02M 3/33507* (2013.01)

(58) Field of Classification Search
CPC ... H02M 3/33507; H02M 1/4258; H02M 7/06
USPC ........................................ 363/126, 127, 129
See application file for complete search history.

(56) References Cited

U.S. PATENT DOCUMENTS

| | | | |
|---|---|---|---|
| 2011/0216564 A1* | 9/2011 | Swamy ................... | H02M 7/08 363/126 |
| 2014/0016356 A1* | 1/2014 | Furmanczyk ........... | H02M 5/14 363/3 |
| 2014/0313800 A1* | 10/2014 | Swamy ................... | H02M 7/08 363/126 |
| 2015/0280604 A1* | 10/2015 | Hassanpoor ............ | H02M 7/06 363/126 |

* cited by examiner

*Primary Examiner* — Gary A Nash
(74) *Attorney, Agent, or Firm* — Keating & Bennett, LLP

(57) ABSTRACT

A multi-phase shift transformer based AC-DC converter includes a single transformer that reflects a negative portion of an AC voltage to become a positive voltage by generating multiple phases from a poly-phase input. The multiple phases generated can be separated by as little as 1° to create a well-approximated DC output without the need for a smoothing circuit. The primary and second windings of the transformer are flat wire conductors structured to provide a larger number of windings per core including a larger number of secondary coils, which provides for a large number of output phases.

26 Claims, 10 Drawing Sheets

MULTI-PHASE SHIFT TRANSFORMER BASED AC-DC CONVERTER

BACKGROUND OF THE INVENTION

1. Field of the Invention

The present invention relates to an AC-DC converter, and in particular, to an AC-DC converter including a multi-phase shift transformer.

2. Description of the Related Art

AC-DC converters take an AC voltage and convert it to a DC voltage. Typically, a bank of diodes arranged in a bridge configuration directs incoming voltage, regardless of which side of the bridge the AC voltage enters, to a DC positive output.

Single phase AC-DC converters operate by first rectifying an alternately positive and negative sine wave (Alternating Current) into a positive half sine wave, essentially reflecting the negative portion of the sine wave into the positive voltage region. This creates a wave which starts at 0 V, rises to a peak voltage, drops back to 0 V, rises again and continues. This is the first stage of rectification.

To approximate a DC voltage from this wave, a smoothing capacitor connected across the load in parallel is charged up during the rising portion of each wave, and the capacitor then discharges slowly as the supplied voltage falls again. The charge in the capacitor ensures that the rectified voltage does not drop back to zero, but instead meets the next wave at some point on the rising portion, creating a smoother, approximately DC output. This is the second stage of rectification.

However, charging the capacitor on the DC side of the converter causes a significant amount of harmonic distortion on the AC side of the converter. This harmonic distortion is commonly referred to in the art as total harmonic distortion, or THD. Essentially the current on the AC side becomes a single spike (as shown in FIG. 1 and discussed below), as opposed to following the AC voltage. This is because the capacitor provides current to the load while it is discharging, and therefore all of the current used by the load is drawn by the capacitor only when it is charging.

The amount of THD caused by the capacitor results in a very low power factor for the AC-DC converter, and thus very low efficiency.

A prior art solution to the above problem is to use a Power Factor Correction circuit, commonly known as a boost PFC circuit. However, this boost PFC circuit still takes energy from the input voltage. A boost PFC circuit typically includes an inductor connected in series with the smoothing capacitor and the load (of the converter), and a switch connected in parallel with the capacitor and load. When the switch of the boost PFC circuit is closed, it effectively bypasses the capacitor and load, and so the capacitor supplies current to the load. When the switch is open, the circuit behaves as if the boost PFC circuit is not there.

By rapidly opening and closing the switch, a current waveform is created which tracks the input voltage waveform. This is however a complicated and inefficient remedy to the problem of current spikes. Furthermore, the current waveform created is in fact an approximation of a sine wave made up of tiny rapid oscillations, or spikes, and therefore there is still an element of harmonic distortion.

Prior art solutions to the above problems use multiple transformers to provide multiple input phases to the converter input. However, this requires a transformer for each set of three input phases.

It would be desirable to provide a solution to the problems discussed above.

SUMMARY OF THE INVENTION

To overcome the problems described above, preferred embodiments of the present invention provide multi-phase shift transformers and AC-DC converters, each of the AC-DC converters including a single multi-phase shift transformer that reflects a negative portion of an AC voltage to become a positive voltage to generate multiple phases from a poly-phase input.

A multi-phase shift transformer based AC-DC converter according to a preferred embodiment of the present invention includes a single transformer that reflects a negative portion of an AC voltage to become a positive voltage by generating multiple phases from a poly-phase input. The multiple phases generated can be separated by as little as 1° to create a well-approximated DC output without the need for a smoothing circuit. The primary and second windings of the transformer are flat wire conductors structured to provide a larger number of windings per core including a larger number of secondary coils, which provides for a large number of output phases.

The above and other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
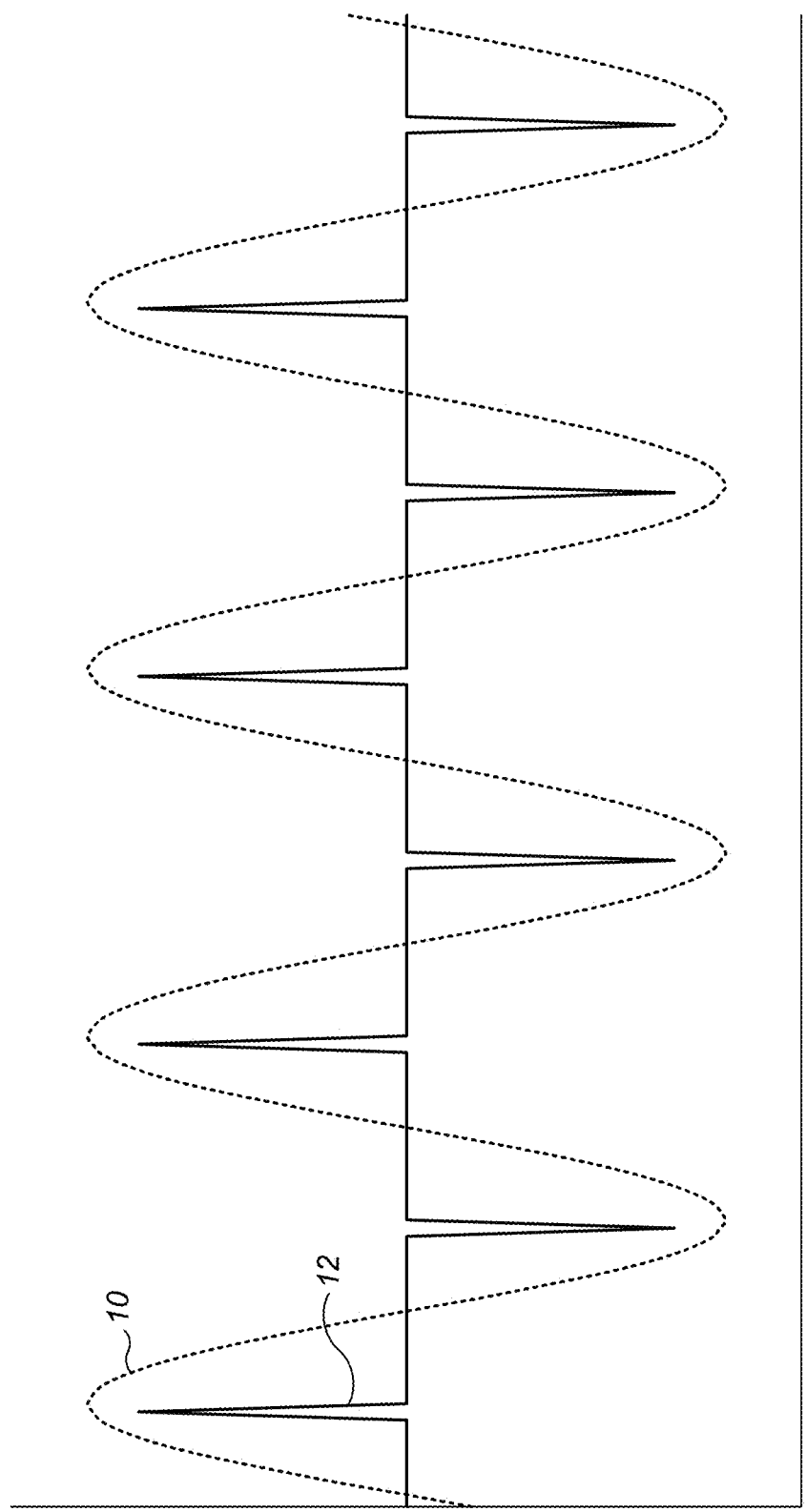
FIG. 1 shows an input voltage and current waveform for a prior art AC-DC converter.

FIG. 1 shows an input voltage and current waveform for a prior art single phase AC-DC converter with a smoothing capacitor as discussed above. The sinusoidal waveform 10 represents the AC voltage input. The waveform 12 showing frequent spikes represents the current at the AC input, which is influenced by the current draw from the DC side of the converter. A smoothing capacitor on the DC side of the converter (as discussed above) supplies current to the output for the period of the voltage wave. Therefore, the current draw at the AC input is instantaneous, as the current quickly rises to charge the capacitor, and then quickly falls while the capacitor is supplying the output.

In power electronics, AC current supply in a sinusoidal waveform is the norm. A non-sinusoidal current wave, such as current wave 12, is the result of harmonic frequencies being added to the fundamental frequency of the sine wave, causing unwanted distortion to the sinusoidal wave. This distortion is what causes inefficiencies in the transfer of power, and creates a low power factor. It can be inferred, therefore, that the closer the current wave is to sinusoidal, the more efficient the power transfer from the AC side of the converter to the DC side.

A multi-phase transformer based AC-DC converter will now be described in which a single transformer provides a set of phase-shifted output voltages to the input of a converter. This multi-phase transformer alleviates power factor and distortion problems caused by a non-sinusoidal current wave like that shown in FIG. 1 and discussed above.

A multi-phase AC-DC converter can provide a rectified output that approximates a DC signal before a smoothing capacitor is used.

The multi-phase shift transformer based AC-DC converter provides a single transformer capable of generating multiple phases from a poly-phase input. These phases can be separated by as little as 1° to create a well approximated DC output without the need for a smoothing circuit.

Figure 2:
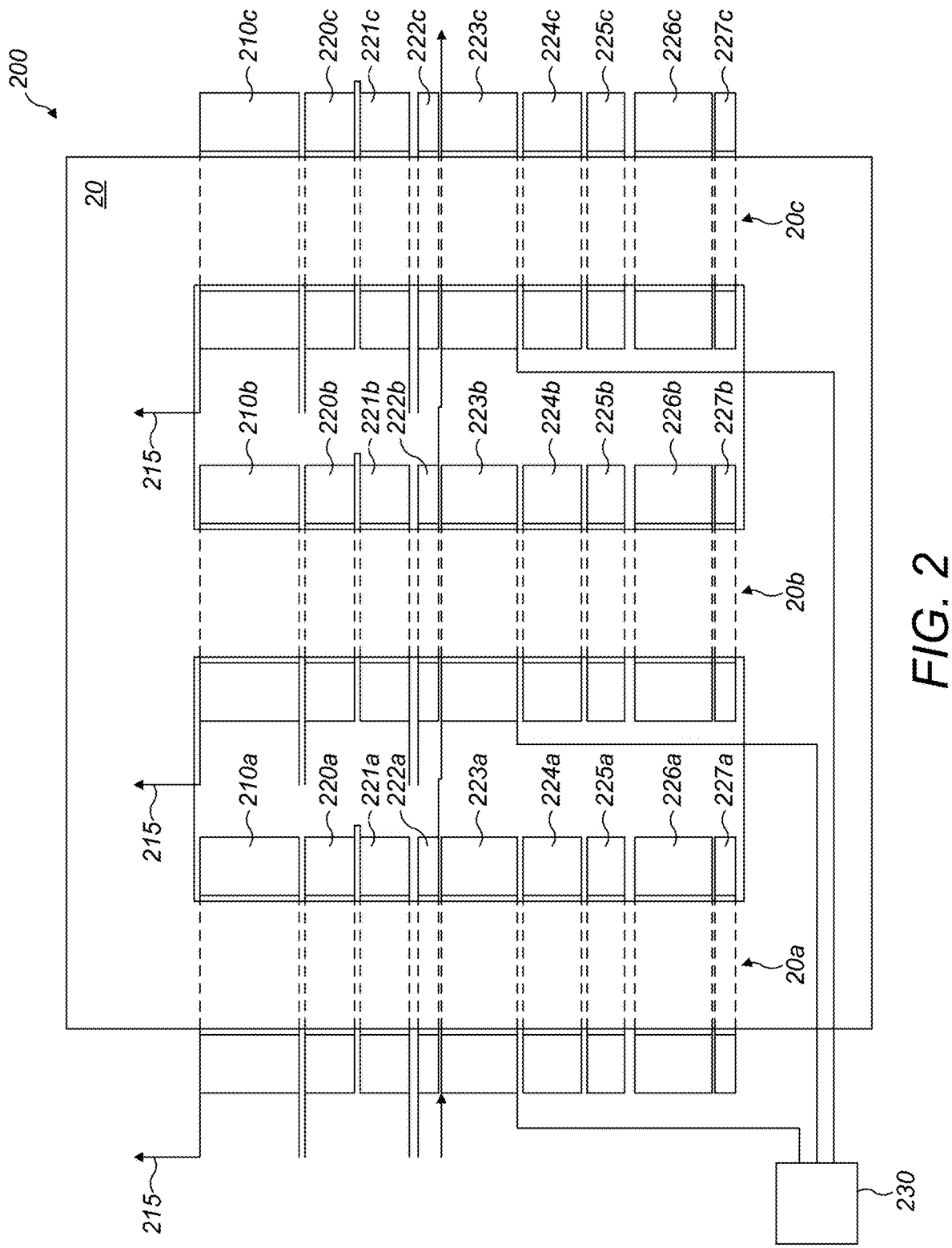
FIG. 2 illustrates a cross-sectional view of a multi-phase shift transformer according to a preferred embodiment of the present invention.

FIG. 2 illustrates a multi-phase shift transformer 200 according to a preferred embodiment of the present invention in cross-section. The multi-phase shift transformer 200 includes a core 20 with three core sections 20a, 20b, and 20c. In the preferred embodiment shown in FIG. 2, the core sections 20a, 20b, and 20c are connected to each other by cross-pieces to define a single integrated core. The cross pieces however are not essential and in alternative preferred embodiments, the core 20 could be formed solely from the core sections 20a, 20b, and 20c supported in a suitable housing. The core 20 can be formed from iron, alloys of iron, ferromagnetic material or any ferrimagnetic material such as aluminium, cobalt, nickel, manganese or zinc.

FIG. 2 shows a multi-phase transformer having a three-phase input. However, any poly-phase input could be used with the transformer 200, in which case the number of core sections of the transformer would then correspond to the number of phases, typically in a 1:1 relationship.

The multi-phase shift transformer 200 of FIG. 2 includes one primary coil 210a, 210b, and 210c, located on each separate core section 20a, 20b and 20c, and corresponding to each input phase. The tails of each primary coil are connected to an input voltage source 215. In FIG. 2, the primary coils 210a, 210b, and 210c are located at the top of the core sections 20a, 20b, and 20c. As will be described below, in alternative preferred embodiments, the arrangement of primary coils 210a, 210b, and 210c could be different.

Figure 9:
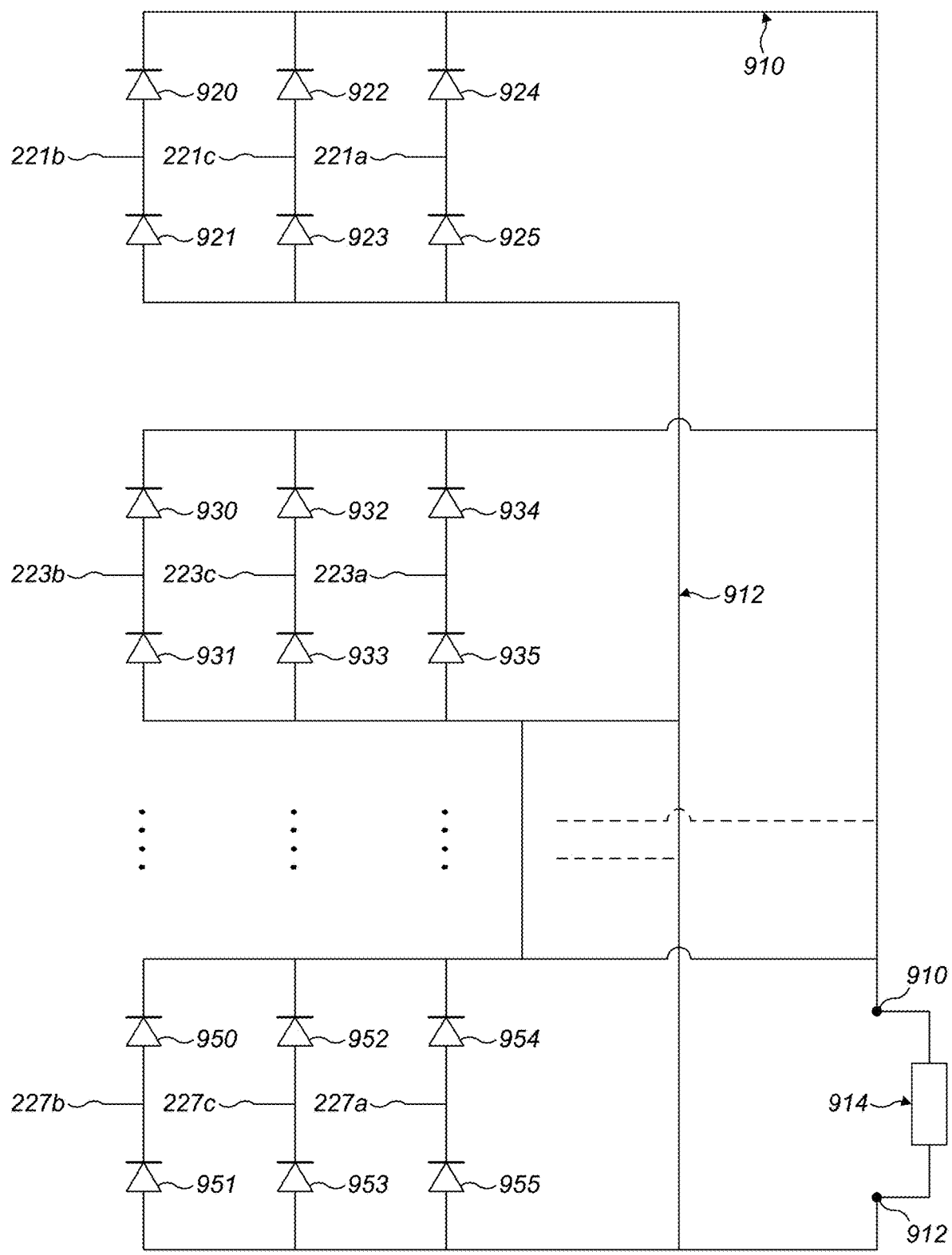
FIG. 9 shows a circuit fed by the transformer.

Box 230 shows the output of the multi-phase shift transformer. Each individual tail (discussed below) connects to the output 230 of the transformer 200. The output 230 of the transformer 200 is then connected to the input of the converter, with each tail connected as shown in FIG. 9 and discussed below.

Eight secondary coils are disposed around each of core sections 20a, 20b, and 20c, for example. Turning now to core section 20a, secondary coils 220a, 221a, 222a, 223a, 224a, 225a, 226a, and 227a are shown. These secondary coils 220a, 221a, 222a, 223a, 224a, 225a, 226a, and 227a generally have different numbers of windings. In FIG. 2, the height of the elements representing the secondary coils is intended to be illustrative of the number of windings. The secondary coils connect directly to an output terminal, and/or cross-connect to secondary coils on another core section, such as core section 20b or 20c.

Figure 7:
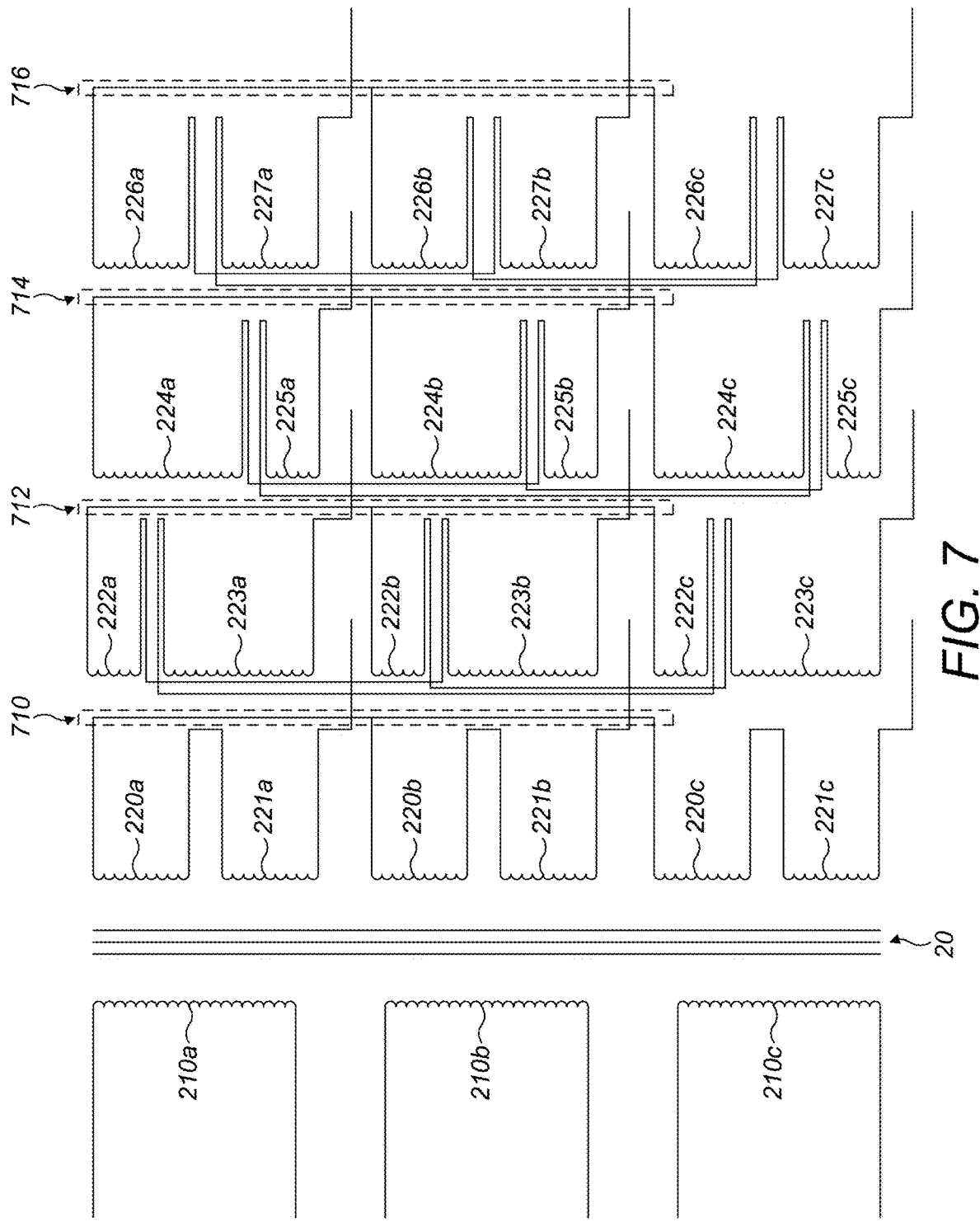
FIG. 7 shows a complete set of connections for all illustrated coils on the transformer of FIG. 2.

The secondary coils 220a, 221a, 222a, 223a, 224a, 225a, 226a, and 227a are arranged pair wise, with one secondary coil in each pair connected in a star configuration, and the other secondary coil connected to the output 230 of the multi-phase transformer 200. The star configurations are illustrated in FIG. 7 and explained further below.

In the case of secondary coils 220a and 221a, each secondary coil includes two ends, each referred to as a 'tail'. One tail of secondary coil 220a is connected to similar tails of corresponding secondary coils 220b and 220c on core sections 20b and 20c at a 'star point'. The other tail of secondary coil 220a connects to a tail of the other secondary coil 221a in the pair, and the other tail of secondary 221a is connected to the output 230 of the multi-phase transformer 200. This arrangement is illustrated schematically in FIG. 3.

Figure 4:
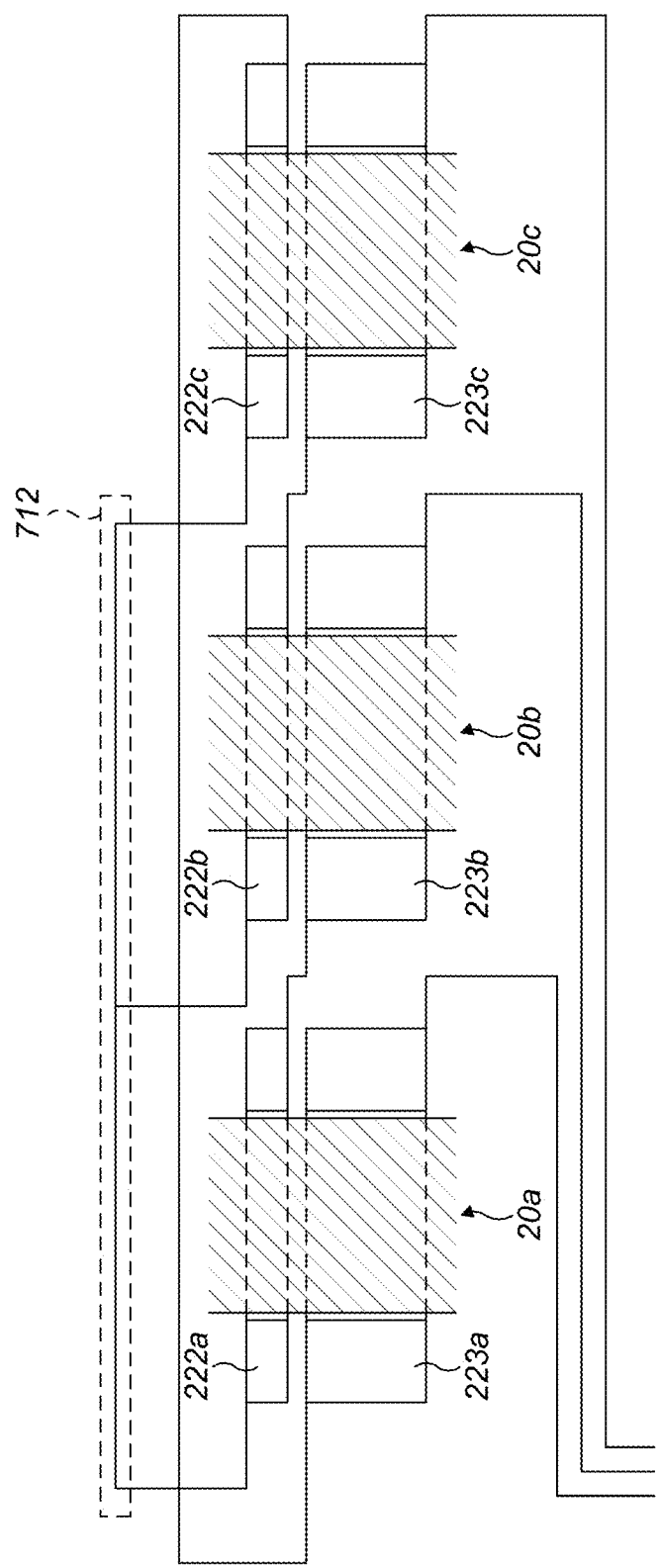
FIG. 4 shows a schematic view of a cross connected pairs of secondary coils in the multi-phase shift transformer of FIG. 2.

Referring again to FIG. 2, one tail of each of the secondary coils 222a, 224a and 226a is similarly connected to star points with the respective secondary coils on core sections 20b and 20c. Thus, secondary coil 222a connects to a star point with secondary coils 222b and 222c; secondary coil 224a connects to a star point with secondary coils 224b and 224c; and so on. The other tails of the respective secondary coils 222a, 224a and 226a are cross-connected to the tail of a corresponding secondary coil on an adjacent core section 20b and 20c. Taking secondary coil 222a as an example, the tail that is not connected to the star point cross-connects to a tail of secondary coil 223b on core section 20b. The other tail of secondary coil 223b connects to an output 230 of the multi-phase transformer 200. Similarly, the tail of secondary coil 222b that is not connected to the star point cross-connects to a tail of secondary coil 223c on core section 20c, with the other tail of secondary coil 223c connecting to an output 230 of the multi-phase transformer 200; and the tail of secondary coil 222c that is not connected to the star point cross-connects to a tail of secondary coil 223a on core section 20a, with the other tail of secondary coil 223a connecting to an output 230 of the multi-phase transformer 200. This is illustrated in FIG. 4. FIG. 4 illustrates a star point 712 at which secondary coils 222a, 222b, and 222c are connected.

Figure 3:
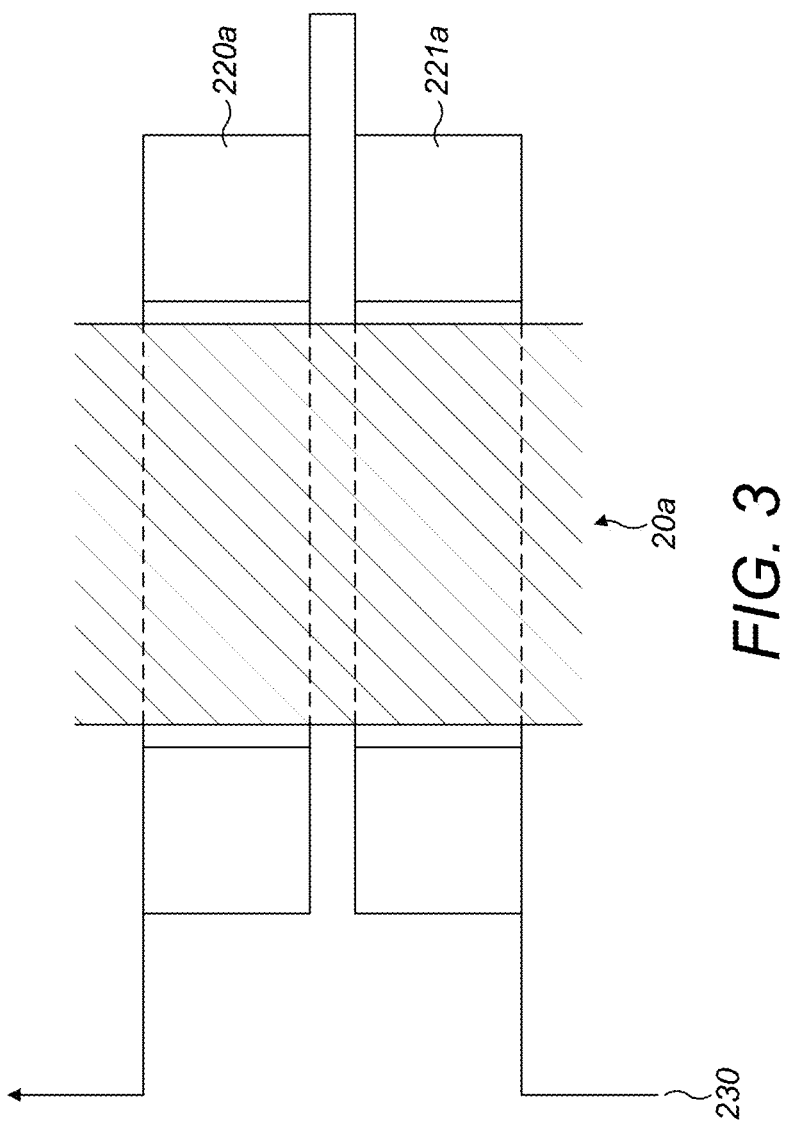
FIG. 3 shows a schematic view of a non-cross connected pair of secondary coils in the multi-phase shift transformer of FIG. 2.

Thus, the arrangement illustrated in FIG. 4 shows cross-connected pair-wise coils, whereas the arrangement in FIG. 3 shows non-cross-connected pair wise coils.

The other pair wise secondary coils on core section 20a, namely secondary coils 224a and 225a, and secondary coils 226a and 227a, are cross-connected secondary coils like those shown in FIG. 4. Although four pairs of secondary coils are shown in FIG. 2 as a non-limiting example, the multi-phase transformer 200 could contain any number of secondary coil pairs on the respective core sections 20a, 20b, and 20c. One of the pairs on each core section 20a, 20b, and 20c is typically non-cross-connected, with the remaining pairs being cross-connected.

As shown in FIG. 2, the total number of windings in each pair of secondary coils is the same as the total number of windings in each primary coil. This assumes that the multi-phase transformer 200 is configured to change only the phase of input voltage signal, and not step-up or step-down the voltage. In alternative preferred embodiments, the multi-phase transformer may be configured to step-up or step-down the voltage, in which case the number of windings in the secondary coils may be different to the number of windings in the primary coils.

The phase of the input voltage signal is shifted depending on the ratio of windings between secondary coils in each pair of secondary coils on each core section 20*a*, 20*b*, and 20*c*. For example, and referring again to FIG. 2, in the pair of secondary coils 222*a* and 223*a*, secondary coil 222*a* has a smaller number of windings than secondary coil 223*a*, giving a ratio of windings specific to the pair of secondary coils 222*a* and 223*a*. Similarly, the number of windings differs for the other pairs of secondary coils, such as secondary coils 224*a* and 225*a*, and for secondary coils 226*a* and 227*a*, giving specific ratios for those pairs. Across the core sections 20*a*, 20*b*, and 20*c*, the ratios of windings for corresponding pairs is the same.

Figure 5:
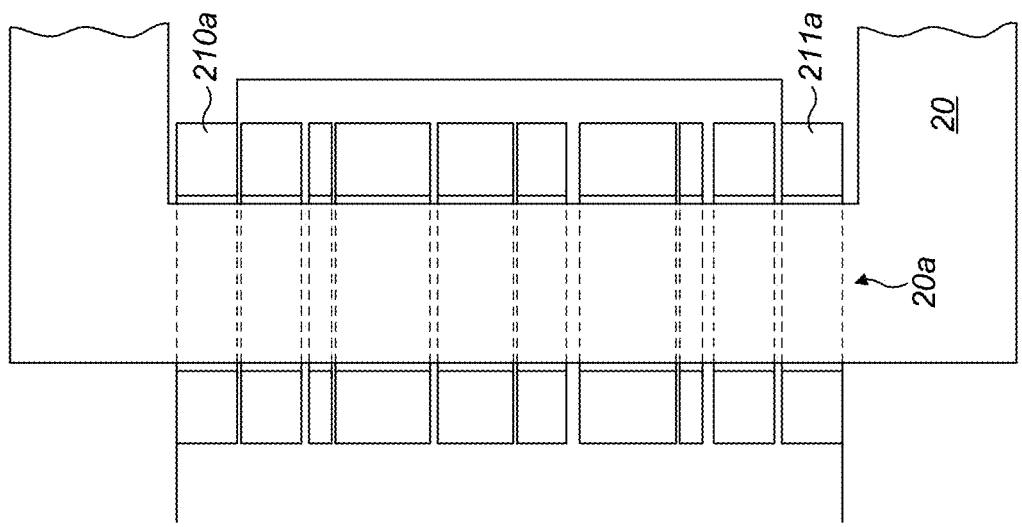

In alternative preferred embodiments, each core section 20*a*, 20*b* and 20*c* may include more than one primary coil. FIG. 5 shows an exemplary core section 20*a* of a multi-phase transformer 200 including two primary coils 210*a* and 211*a*. Primary coil 210*a* is located at the top of core section 20*a*, and primary coil 211*a* is located at the bottom of core section 20*a*. A tail of primary coil 210*a* is connected to a voltage source, and the other tail of primary coil 210*a* is connected to a tail of primary coil 211*a*. The other tail of primary coil 211*a* is then also connected to the voltage source, so that the two coils connected together are connected across a voltage source.

Figure 6:
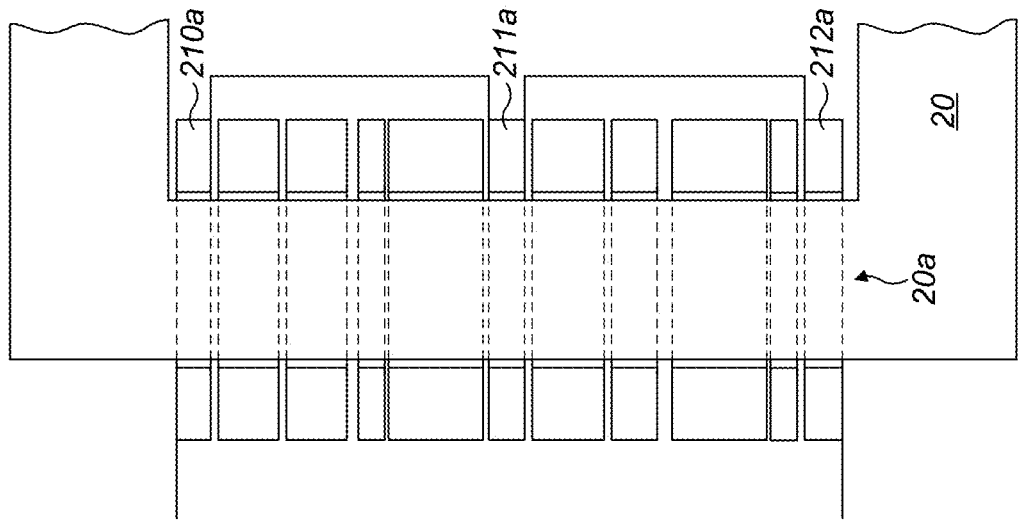
FIGS. 5 and 6 show alternative arrangements of coils on the multi-phase shift transformer core.

FIG. 6 shows an exemplary core section 20*a* of a further alternative preferred embodiment in which multi-phase transformer 200 includes three primary coils 210*a*, 211*a*, and 212*a*. Primary coil 210*a* is located at the top of core section 20*a*, and primary coil 211*a* is located at the center of core section 20*a*, and primary coil 212*a* is located at the bottom of core section 20*a*. A tail of primary coil 210*a* is connected to a voltage source, and the other tail of primary coil 210*a* is connected to a tail of primary coil 211*a*. The other tail of primary coil 211*a* is connected to a tail of primary core 212*a*, and the other tail of primary coil 212*a* is connected to the voltage source, so that the three coils connected together are connected across a voltage source.

Other preferred embodiments may also be possible, with primary coils connected together in series and located at even or random intervals throughout the core section.

The magnetic coupling between coils in a transformer diminishes as the coils get further apart. In the example arrangement of primary coils of FIG. 2, the maximum distance from a primary coil 210*a* to a secondary coil is to secondary coil 227*a*, and is nearly the full length of the core section 20*a*. In the example of FIG. 5, the maximum distance from a primary coil 210*a* or 211*a* to a secondary coil is to secondary coil 222*a* or 223*a*, which is half the distance of the length of core section 20*a*. In the example of FIG. 6, the maximum distance is a quarter of the length of core section 20*a*.

FIG. 3 shows an exemplary set of connections between secondary coils 222*a*, 222*b*, and 222*c*, and secondary coils 223*a*, 223*b* and 223*c*. FIG. 7 shows a complete set of connections for all illustrated coils on the transformer of FIG. 2. Dashed lines 710, 712, 714 and 716 show the individual star connections for each set of pair-wise connected secondary coils. Like numerals denote like elements or portions of the transformer. As noted above, the ratio of windings and the type of connection, cross-connected or non-cross-connected, affects the resulting phase at the output of the transformer.

The phase of the voltage induced in each of the secondary coils on each core section is in phase with the voltage of the primary coil on each core section.

The supplied voltage phase for each primary coil is 120° out of phase with the primary coil on the next core. For instance, referring back to FIG. 2, in one arrangement, the supplied voltage phase to primary coil 210*a* is nominally 0°. The supplied voltage phase to primary coil 210*b* then leads the supplied voltage phase to primary coil 210*a* by 120°. The supplied voltage phase to primary coil 210*c* then leads the supplied voltage phase to primary coil 210*b* by 120°.

The resultant phase of each cross-connected pair-wise secondary coil is a combination of the induced voltage phase of each coil. If coils 222*a* and coil 223*b* have the same number of turns the resultant phase will lead the primary coil 210*a* input phase by 150°. If coils 222*a* and 223*b* have different numbers of turns, as shown in FIGS. 2 and 4, the resultant phase will lead by an angle between 120° and 180°. The resultant phase angle can be calculated using the following equation:

$$A = \frac{180}{\pi} \cdot \mathrm{acos}\left(\frac{2 \cdot n1^2 - n1 \cdot n2}{2 \cdot n1 \cdot \sqrt[2]{n1^2 \cdot n2^2 - n1 \cdot n2}}\right)$$

where:

n1 is the number of turns in the first half secondary coil (220*a*, 222*a*, 220*b*, 222*b*, 220*c*, 222*c* etc.).

n2 is the number of turns in the second half secondary coil (221*a*, 223*a*, 221*b*, 223*b*, 221*c*, 223*c* etc.).

A is the resultant phase angle.

Conversely, the cross-connected pair-wise secondary coils may be cross-connected in the opposite direction. Using the secondary coils of FIG. 4 as an example, one tail of secondary core 222*a* is connected to star point 712*a*. The other tail of secondary coil 222*a* may be connected to a tail of secondary coil 223*c*, and the other tail of secondary coil can be connected to the output of the transformer. In this case, the resultant phase will lead the core phases by 180° to 240°.

Using just three phases separated by 120°, the multi-phase shift transformer therefore allows full coverage of the phase spectrum. By providing a number of half-secondary coils on each core, a whole range of different output phases can be produced from one transformer. In a preferred embodiment described herein, assuming that the AC input has three phases at 0°-120°-240°, the four output stages provide a single unshifted phase output of 0°-120°-240°, and three shifted phase outputs of 45°-165°-285°, 90°-210°-330° and 135°-255°-015°. In an alternative preferred embodiment, assuming that the AC input has three phases at 0°-120°-240°, the four output stages provide a single unshifted phase output of 0°-120°-240°, and three shifted phase outputs of 30°-150°-270°, 60°-180°-300° and 90°-210°-330°.

To further alter the output phases, each core can include more than one primary coil, and each of these primary coils may be connected to separate phases to induce a phase-vectored voltage in the secondary coils (not illustrated).

A two phase, 90° separated alternative to the three phase example above can also provide a well approximated DC output, as each phase can be shifted to provide a wave between 0-90° from the input phases.

The higher the number of output phases produced, the better approximated the first stage rectified DC output signal. As the first stage rectified signal approaches a constant DC voltage, the size of a smoothing circuit (the second stage) can be reduced to nothing. This means that the current drawn by the load from the AC side of the converter is not used to charge a capacitor, and the current therefore follows the voltage. This results in a much lower level of THD and the resultant circuit has a much higher power factor.

There exists a problem in building a transformer as described above, which is capable of providing the power required, e.g., 500 KVA, and which is also of a small enough size to be practical. To provide a multi-phase output (and not just a phase shifted output), a large number of half-secondary coils must be present on each core. The coil material must have a significant cross-sectional area to handle the required current in each phase.

Figure 8:
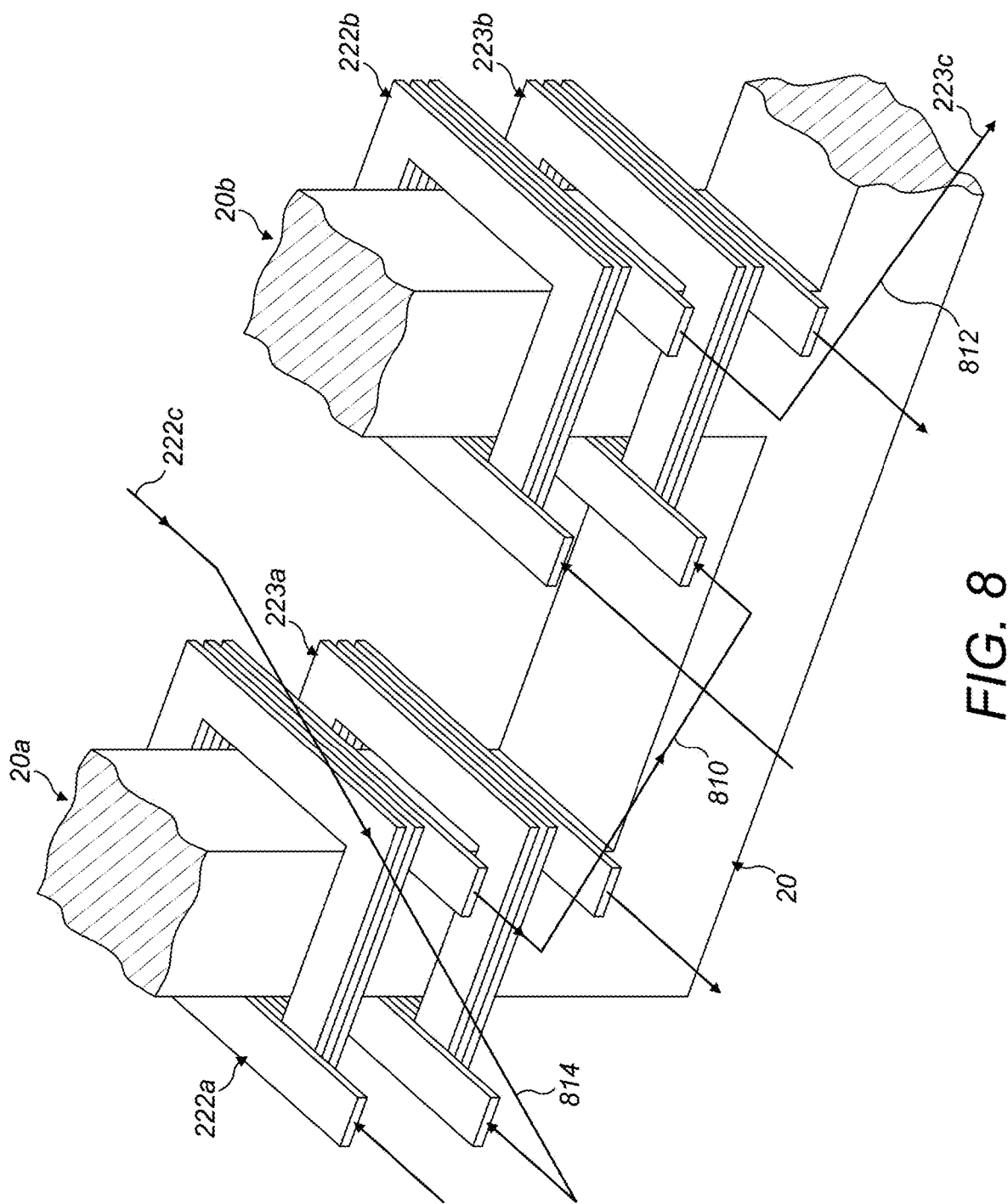
FIG. 8 shows a partial drawing of a physical implementation of the transformer.

To overcome the above problems and requirements, the inventors of the preferred embodiments of the present invention described and claimed herein discovered that a type of flat-wire winding can be used. FIG. 8 shows an elevation view of a preferred embodiment in cross-section through a portion of a multi-phase transformer.

Core block 20, with cores 20*a*, 20*b* and 20*c* (not shown), is wound with secondary coils of flat-wire 222*a*, 223*a*, 222*b* and 223*b*. The cross section of the flat-wire which defines the coils 222*a*, 222*b*, 223*a*, 223*b* is rectangular or substantially rectangular. The electrically conductive material in the present example is a flat wire, though other electrically conductive materials could be used. It can be seen that the flat wire has a small thickness relative to its width, where the thickness of the wire is measured in the direction parallel to the axis of the coil, and the width is measured in a direction perpendicular to the axis of the coil. The electrically conductive material is flat enamelled copper wire. Alternatively, other electrically conductive materials, such as aluminium, may be used, along with conductive materials with other cross sections and dimensions.

The illustrative example of FIG. 8 could also correspond to a two phase transformer, or any other poly-phase transformer.

Connections are made from secondary coil 222*a* to secondary coil 223*b* by conductor 810, as well as secondary coil 222*b* to secondary coil 223*c* (not illustrated) by conductor 812 and secondary coil 222*c* (not illustrated) to secondary coil 223*a* by conductor 814. The conductors may be electrical wires, printed traces, or other electrical connections suitable for carrying the current flowing in the flat wires.

The use of flat wire coils results in a large number of half-secondary coils being able to be provided on each core. This provides a great number of possible phase outputs. For instance, in a transformer with a three phase input, eight half-secondary coils on each core can provide 24 output phases separated by 15°. 10 half-secondary coils can produce 30 phases, separated by 12° each. 12 half secondary coils can produce 36 phases separated by 10° each. 16 half secondary coils can produce 48 phases separated by 7.5° each. It is possible to achieve a separation of 1° by providing 120 half secondary coils, for example.

FIG. 9 shows an AC-DC converter circuit which incorporates the multi-phase transformer described above. In particular, FIG. 9 shows a rectification circuit incorporating a three phase transformer with four sets of secondary coils pairs. In the diagram, the third set of secondary coils pairs is omitted to save space in the diagram. In practice, any number of sets could be incorporated in the multi-phase transformer.

Referring to the top section of FIG. 9, the output tails from secondary coils 221*b*, 221*c*, and 221*a*, can be seen as being connected to nodes between pairs of diodes 920 and 921, 922 and 923, and 924 and 925 respectively, which are arranged in a diode bank. Similarly, referring to the middle section of the diagram, the output tails from secondary coils 223*b*, 223*c*, and 223*a*, can be seen as being connected to nodes between pairs of diodes 930 and 931, 932 and 933, and 934 and 935 respectively. The third set corresponding to outputs from secondary coils 225*b*, 225*c*, and 225*a* is omitted, and the bottom section of FIG. 9 shows the output tails from secondary coils 227*b*, 227*c*, and 227*a* can be seen as being connected to nodes between pairs of diodes 950 and 951, 952 and 953, and 954 and 955, respectively.

As an AC voltage is produced in each secondary coil set, the positive and negative voltages at the coil outputs switch polarity each cycle. The purpose of the diodes 920 to 955 is therefore to direct voltage and current towards a positive bus output 910, at which a load 914 may be connected. A return path from output 912 is connected to the return side of the diode pairs. The load 914 can be connected between outputs 910 and 912.

In alternative arrangements, the first tails of each pair-wise connected secondary coil may not be connected together to form the star point as shown in boxes 710, 712 etc in FIG. 7. In this arrangement, the coil sets can be connected straight into the circuit with, for example, a first tail of secondary coil 222*a* connected to the return path 912, and a second tail of secondary coil 223*b* connected to a diode, in turn connected to the positive bus 910 to create a half wave rectifier. The half wave rectifier does not reflect the negative voltage to the positive portion of the output, and so this will result in half the number of pulses at the output. In this case, only the diodes 920, 922 and 924 will be present.

In the circuit of FIG. 9, there is no smoothing component or circuit, and the output waveform can be improved by adding more phases to the transformer. Adding these phases is made possible using the flat-wire coil.

Figure 10:
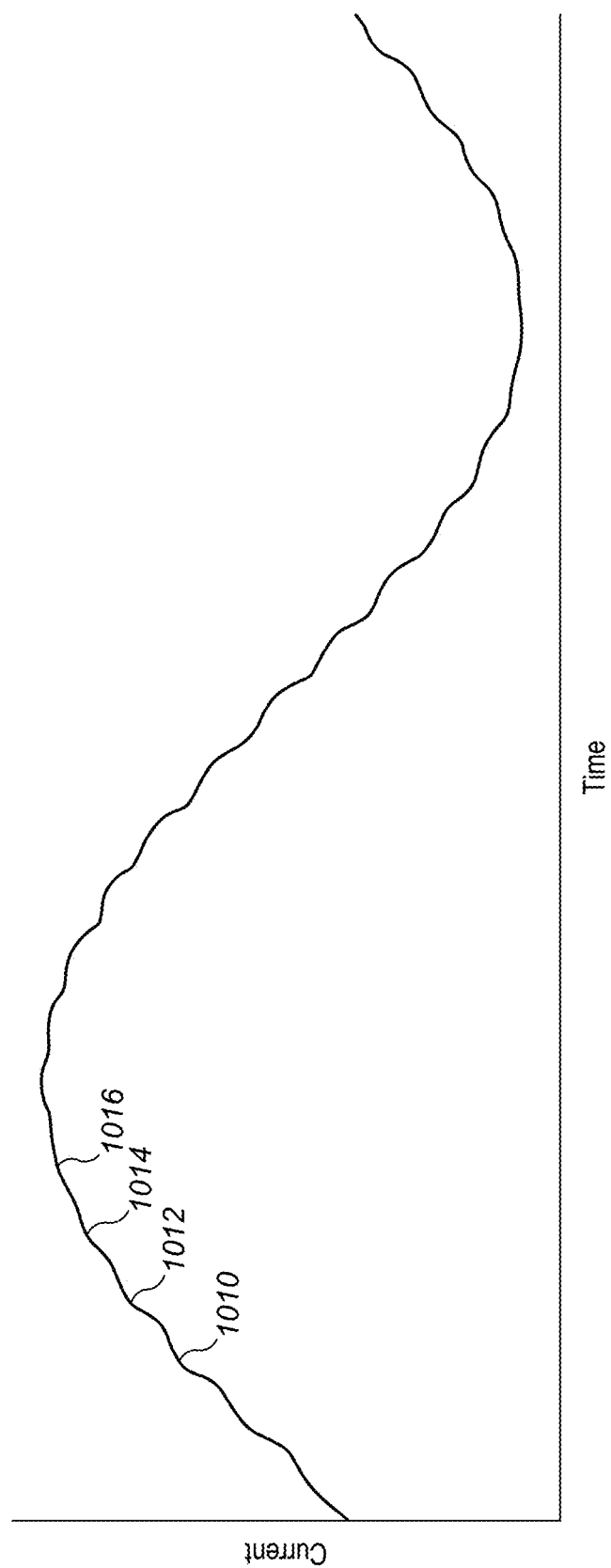
FIG. 10 shows an input current waveform for the multi-phase transformer based AC-DC converter.
Figure 11:
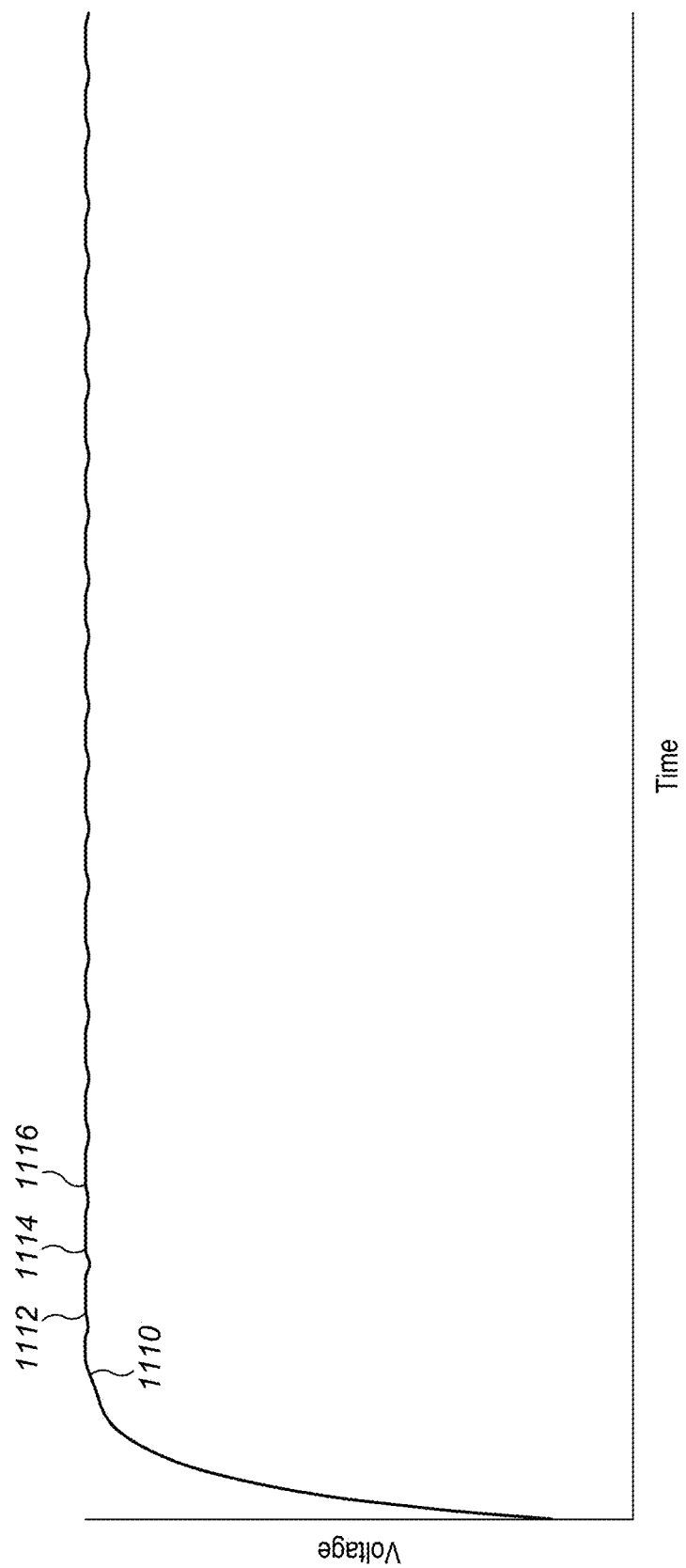
FIG. 11 shows an output voltage waveform for the multi-phase transformer based AC-DC converter.

FIG. 10 shows an input current waveform for a phase of the multi-phase transformer based AC-DC converter. The current waveform for the converter described herein much more closely resembles a sine wave. This is due to the lack of a smoothing circuit causing total harmonic distortion in the circuit. The current pulses upwards to approximate a sine wave, with each pulse coinciding with a voltage peak, as can be seen in FIG. 11. The pulses are shown illustratively as pulses 1010, 1012, 1014, and 1016

FIG. 11 shows an output voltage waveform for the converter, which in this case shows twenty four pulses per cycle, corresponding to a nine coil per core transformer (one primary and 8 half secondaries). The twenty four pulses correspond to the 24 pulses in the current waveform and are shown illustratively as pulses 1110, 1112, 1114, and 1116. This circuit will have a DC ripple voltage of less than 1% of the rated output voltage.

References in the preceding examples to a transformer indicate that there is a primary winding and a secondary winding coupled so that one winding induces a voltage in the other winding. The example of a transformer is not limited to any arrangement of windings and a core, and can indeed contain no core, a core with an air gap, a solid core, and any number of primary and secondary windings. The example of a transformer is not intended to limit the operation of a primary and secondary winding to inducing voltage via transformer action.

Reference in the preceding examples to a diode may be understood to refer to any type of diode, or indeed to any switch configured to allow current flow in one direction while blocking current in the opposite direction.

Preferred embodiments of the present invention may take the form of an embedded converter device, wherein the windings are disposed around a magnetic core embedded in a substrate. The converter device may advantageously be used as part of power switching electronic devices.

Described above are a number of preferred embodiments with various optional features. It should be appreciated that, with the exception of any mutually exclusive features, any combination of one or more of the optional features are possible.

Various modifications to the preferred embodiments described above are also possible and will occur to those skilled in the art without departing from the scope of the invention which is defined by the following claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An AC-DC converter, comprising:
a multi-phase shift transformer including at least two core sections with separate primary and secondary coils wound around each of the at least two core sections;
a diode bank connected between outputs of the secondary coils and an output terminal of the AC-DC converter; wherein
each of the primary and secondary coils includes a plurality of turns of a conductor that is defined by an electrically conductive flat wire; and
the flat wire has a thickness that is less than a width thereof, and the thickness of the flat wire is measured in a direction parallel to a coil axis of a respective one of the primary and secondary coils, and the width is measured in a direction perpendicular to the coil axis.

2. The AC-DC converter of claim 1, wherein the multi-phase shift transformer comprises;
at least 2 ferrous cores;
at least 5 metal transformer coils for each of the at least 2 ferrous cores; wherein
at least one of the at least 5 metal transformer coils for each of the at least 2 ferrous cores is a primary coil, configured to be connected to a phase of a multi-phase AC voltage source;
at least four of the at least 5 metal transformer coils for each of the at least 2 ferrous cores are secondary coils;
one terminal of each of the at least four transformer coils is connected to a terminal of another one of the at least four transformer coils to define a secondary coil set;
at least one of the secondary coil sets spans two of the at least 2 ferrous cores;
the diode bank includes at least one diode for each of the secondary coil sets between each of the secondary coil sets and a positive output bus so that each of the at least one diode conducts electricity from a neutral output bus to the positive output bus.

3. The AC-DC converter of claim 2, wherein the diode bank includes a second diode for each of the secondary coils between each of the secondary coil sets and a neutral output bus.

4. The AC-DC converter of claim 3, wherein one half of the secondary coils include one terminal connected to one other coil on each of the core sections.

5. The AC-DC converter of claim 1, further comprising a poly-phase AC voltage supply.

6. The AC-DC converter of claim 5, wherein the poly-phase AC voltage supply is a two phase AC voltage supply, and the two phases are separated by 90°.

7. The AC-DC converter of claim 5, wherein the poly-phase AC voltage supply is a three phase AC voltage supply, and the three phases are separated by 120°.

8. The AC-DC converter of claim 1, wherein the at least two core sections include 3 core sections.

9. The AC-DC converter of claim 1, wherein a number of turns of two cross-connected secondary coils of the secondary coils is equal to a number of turns of each of the primary coils.

10. The AC-DC converter of claim 1, wherein a shape of an area enclosed by the primary and secondary coils is rectangular, square or circular.

11. The AC-DC converter of claim 1, wherein a number of the secondary coils per core is eight.

12. The AC-DC converter of claim 1, wherein a number of the secondary coils per core is ten.

13. The AC-DC converter of claim 1, wherein there are two of the primary coils provided for each of the at least two core sections.

14. The AC-DC converter of claim 13, wherein the primary coils define first and last coils on each of the core sections.

15. The AC-DC converter of claim 13, wherein the primary coils are connected together.

16. The AC-DC converter of claim 13, wherein the primary coils are connectable to separate electrical phases.

17. The AC-DC converter of claim 1, wherein there are three of the primary coils for each of the core sections.

18. The AC-DC converter of claim 17, wherein the primary coils define first, last and center coils on each of the core sections.

19. The AC-DC converter of claim 1, wherein each of the secondary coils is structured such that a number of turns of the respective secondary coil plus a number of turns of another of the secondary coils on a same one of the core sections is equal to a total number of turns of the primary coil.

20. An AC-DC converter comprising:
a shift transformer including:
first and second cores;
a first primary coils wound around the first core;
a second primary coil wound around the second core;
first and second secondary coils wound around the first core; and
third and fourth secondary coils wound around the second core; and
a rectification circuit connected to each of the second and fourth secondary coils; wherein
each of the first and third secondary coils are connected to a first star point; and
the AC-DC converter does not include a smoothing circuit.

21. The AC-DC converter of claim 20, wherein the first and second secondary coils are connected to each other, and the third and fourth secondary coils are connected to each other.

22. The AC-DC converter of claim 20, wherein the first and fourth secondary coils are connected to each other, and the second and third secondary coils are connected to each other.

23. The AC-DC converter of claim 20, wherein
the shift transformer further includes:
a third core;
a third primary coil wound around the third core; and
fifth and sixth secondary coils wound around the third core;
the rectification circuit is connected to the sixth secondary coil; and
the fifth secondary coil is connected to the first star point.

24. The AC-DC converter of claim 20, wherein
the shift transformer further includes:
fifth and sixth secondary coils wound around the first core; and
seventh and eighth secondary coils wound around the second core;
the rectification circuit is connected to the sixth and eighth secondary coils; and
the fifth and seventh secondary coils are connected to a second star point.

25. The AC-DC converter of claim 20, wherein the first and second primary coils and the first, second, third, and fourth secondary coils are defined by an electrically conductive flat wire.

26. An AC-DC converter, comprising;
a multi-phase shift transformer including at least two core sections with separate primary and secondary coils wound around each of the at least two core sections;
a diode bank connected between outputs of the secondary coils and an output terminal of the AC-DC converter; wherein
each of the primary and secondary coils includes a plurality of turns of a conductor that is defined by an electrically conductive flat wire; and
each of the secondary coils is structured such that a number of turns of the respective secondary coil plus a number of turns of another of the secondary coils on a same one of the core sections is equal to a total number of turns of the primary coil.

* * * * *